United States Patent
Rahman et al.

(10) Patent No.: US 11,310,148 B2
(45) Date of Patent: Apr. 19, 2022

(54) METHODS, SYSTEMS, AND COMPUTER PROGRAMS FOR INTELLIGENT CONTENT DELIVERY USING A SOFTWARE DEFINED NETWORK AND EDGE COMPUTING

(71) Applicant: AT&T Intellectual Property I, L.P., Atlanta, GA (US)

(72) Inventors: Moshiur Rahman, Marlboro, NJ (US); Lucia Otto, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/429,252

(22) Filed: Jun. 3, 2019

(65) Prior Publication Data

US 2020/0382408 A1 Dec. 3, 2020

(51) Int. Cl.
| | |
|---|---|
| *H04L 12/759* | (2013.01) |
| *H04L 12/24* | (2006.01) |
| *H04L 12/801* | (2013.01) |
| *H04L 45/028* | (2022.01) |
| *H04L 45/30* | (2022.01) |
| *H04L 41/00* | (2022.01) |
| *H04W 28/02* | (2009.01) |
| *H04L 47/20* | (2022.01) |

(52) U.S. Cl.
CPC ............ *H04L 45/028* (2013.01); *H04L 41/20* (2013.01); *H04L 45/30* (2013.01); *H04L 47/14* (2013.01); *H04L 47/20* (2013.01)

(58) Field of Classification Search
CPC ....... H04L 45/028; H04L 45/30; H04L 41/20; H04L 47/14; H04L 47/20

USPC .......................................................... 709/224
See application file for complete search history.

(56) References Cited

U.S. PATENT DOCUMENTS

| | | | | |
|---|---|---|---|---|
| 9,838,272 | B2* | 12/2017 | Djukic | H04L 41/5058 |
| 9,998,954 | B2* | 6/2018 | Roeland | H04L 47/76 |
| 10,070,344 | B1* | 9/2018 | Dowlatkhah | H04W 28/16 |
| 10,149,193 | B2* | 12/2018 | Cui | H04W 28/0231 |
| 10,501,055 | B1* | 12/2019 | Yi | B60R 25/257 |
| 10,798,635 | B2* | 10/2020 | Seenappa | H04W 60/04 |
| 2003/0091032 | A1* | 5/2003 | Laxman | H04L 12/2856 |
| | | | | 370/352 |
| 2004/0042469 | A1* | 3/2004 | Clark | H04L 45/36 |
| | | | | 370/401 |
| 2004/0221019 | A1* | 11/2004 | Swildens | H04L 67/1008 |
| | | | | 709/217 |

(Continued)

*Primary Examiner* — Tauqir Hussain
(74) *Attorney, Agent, or Firm* — Guntin & Gust, PLC; Kenneth Silkit Kwan

(57) ABSTRACT

In a network, intelligent content delivery is accomplished by receiving, at an edge server, performance measures from a plurality of local edge servers. Routing policies from an analytics application in a software defined network are received in the edge server that stores address and routing information and the routing policies. The routing policies are distributed to the local edge servers. The local edge servers periodically query the edge server for any changes to the routing policies and when there is a change distributing the change to the routing policies to the local edge servers. When an anomaly is detected at the local edge server, a notification is sent to the edge server that then instructs an orchestrator server to implement the routing policies responsive to the anomaly notification.

20 Claims, 8 Drawing Sheets

(56) References Cited

U.S. PATENT DOCUMENTS

| | | | |
|---|---|---|---|
| 2012/0072311 A1* | 3/2012 | Khan | G06Q 30/0635 705/26.81 |
| 2013/0311551 A1* | 11/2013 | Thibeault | H04L 41/0806 709/203 |
| 2016/0094641 A1* | 3/2016 | Rahman | G06F 9/5077 718/1 |
| 2017/0257664 A1* | 9/2017 | Tam | H04N 21/435 |
| 2017/0279847 A1* | 9/2017 | Dasgupta | H04L 41/065 |
| 2017/0332117 A1* | 11/2017 | Haritaoglu | H04N 21/816 |
| 2018/0183860 A1* | 6/2018 | Majumdar | H04L 67/1002 |
| 2018/0288141 A1* | 10/2018 | Mo | H04L 67/2842 |
| 2019/0053000 A1* | 2/2019 | Filippou | G06F 8/76 |
| 2019/0104434 A1* | 4/2019 | Duan | H04W 68/00 |
| 2019/0208007 A1* | 7/2019 | Khalid | G06F 16/178 |
| 2019/0208438 A1* | 7/2019 | Yang | H04L 43/16 |
| 2019/0230046 A1* | 7/2019 | Djukic | H04L 47/822 |
| 2019/0394820 A1* | 12/2019 | Patil | H04W 60/00 |
| 2020/0090208 A1* | 3/2020 | Reichenbach | B60R 16/0231 |
| 2020/0092923 A1* | 3/2020 | Abraham | H04L 12/185 |
| 2020/0100115 A1* | 3/2020 | Skaaksrud | A62C 3/002 |
| 2020/0120446 A1* | 4/2020 | Stammers | H04L 67/16 |
| 2020/0213419 A1* | 7/2020 | Ren | H04W 4/70 |
| 2020/0314694 A1* | 10/2020 | Yu | H04W 28/10 |
| 2020/0336911 A1* | 10/2020 | Duan | H04W 12/086 |
| 2020/0382408 A1* | 12/2020 | Rahman | H04L 45/30 |

\* cited by examiner

METHODS, SYSTEMS, AND COMPUTER PROGRAMS FOR INTELLIGENT CONTENT DELIVERY USING A SOFTWARE DEFINED NETWORK AND EDGE COMPUTING

TECHNICAL FIELD

The present disclosure relates to content delivery in a network. More particularly, the disclosure relates to a method, system, and computer program for intelligent content delivery using a software defined network and edge computing.

BACKGROUND 5G (from "5th Generation") is the latest generation of cellular mobile communications. It succeeds the 4G (LTE-A, WiMax), 3G (UMTS, LTE) and 2G (GSM) systems. The major advantages of 5G networks are significantly higher data rates than previous cellular networks, and lower network latency. 5G networks use higher frequency radio waves, than those used by previous cellular networks to achieve those advantages.

A key characteristic of 5G services associated with content-delivery and internet of things (IoT) devices, is the variance of their demands, in time and space. Therefore, flexibility and reconfigurability can enable the mobile network to adapt to these variations and achieve cost efficiency, dispensing with the need of planning for worst-case scenarios.

However, today's connection-centric mobile networks do not possess the required flexibility to adapt to varying traffic needs. There is no current implementation solution exists that can fully support dynamic content delivery anywhere and in any access, by leveraging an integrated solution. Today all the current technology enablers are not fully intelligently coordinated to support 5G. The blended solutions and the benefits of all the available technology capabilities are not fully realized yet.

SUMMARY

One general aspect includes a method that includes receiving, at a first edge server, performance measures from a plurality of local edge servers and routing policies from an analytics application in a software defined network. The first edge server stores address and routing information and the routing policies. The method also includes distributing from the first edge server the routing policies to the plurality of local edge servers. The method also includes receiving from the plurality of local edge servers a periodic query of a change to the routing policies, and distributing in response to the periodic query the change to the routing policies to the plurality of local edge servers. The method also includes receiving an anomaly notification from at least one of the plurality of local multi access edge computing servers and executing the routing policies via an orchestrator server.

Implementations may include one or more of the following features. The method where the first edge server is disposed in a radio access network. The method further including transmitting CPRI traffic from the plurality of local edge servers to the first edge server. The method where the routing policies are stored in a software defined network analytic application.

One general aspect includes a system including a memory for storing computer instructions and a processor coupled with the memory, where the processor, responsive to executing the computer instructions, performs operations that include receiving, at a first edge server, performance measures from a plurality of local edge servers. The operations further include receiving, at the first edge server, routing policies from an analytics application in a software defined network. The operations further include storing, at the first edge server address and routing information and the routing policies. The operations performed by the computer also include distributing from the first edge server the routing policies to the plurality of local edge servers. The operations performed by the computer also include receiving from the plurality of local edge servers a periodic query of a change to the routing policies. The operations performed by the computer also include distributing in response to the periodic query the change to the routing policies. The operations performed by the computer also include receiving, at the first edge server an anomaly notification from at least one of the plurality of local edge servers, and instructing an orchestrator server to implement the routing policies responsive to the anomaly notification.

Implementations may include one or more of the following features. The system where the first edge server is disposed in a radio access network. The system where the processor performs operations further including transmitting CPRI traffic from the plurality of local edge servers to the first edge server. The system where the routing policies are stored in a software defined network analytic application.

One general aspect includes a non-transitory, tangible computer-readable medium having computer-executable instructions stored thereon which, when executed by a computer, cause the computer to perform a method. The method performed includes receiving, at a central multi access edge computing server, performance measures from a plurality of local multi access edge computing servers. The first edge server stores address and routing information and the routing policies. The method performed also includes distributing from the first edge server the routing policies to the plurality of local edge servers. The method performed also includes receiving from the plurality of local edge servers a periodic query of a change to the routing policies, and distributing in response to the periodic query the change to the routing policies to the plurality of local edge servers. The method performed also includes receiving an anomaly notification from at least one of the plurality of local multi access edge computing servers and executing the routing policies via an orchestrator server.

DETAILED DESCRIPTION OF ILLUSTRATIVE EMBODIMENTS

Glossary

Figure 1:
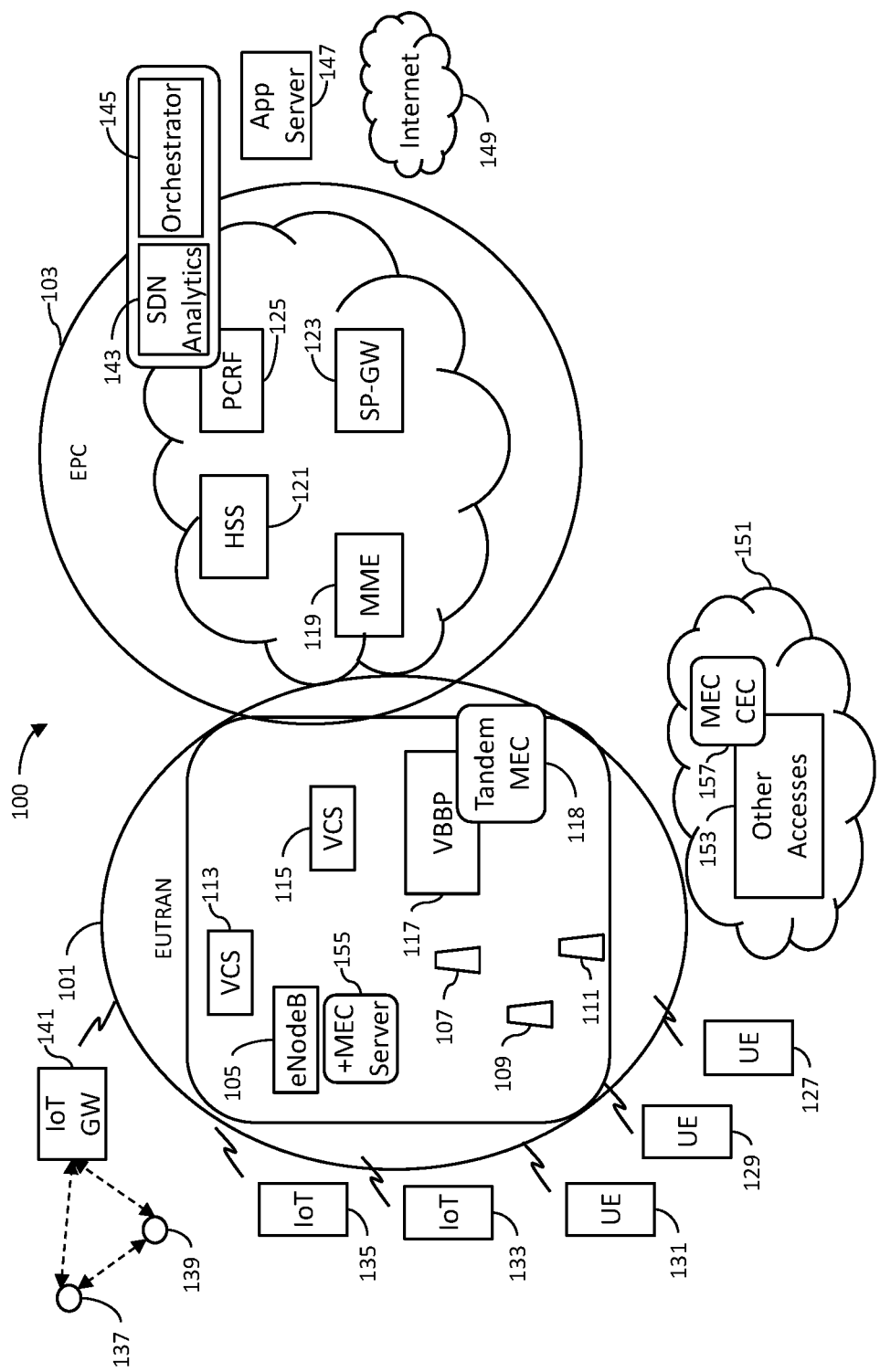
FIG. 1 is a block diagram of a system architecture for a system for intelligent content delivery using a software defined network and edge computing.

Application Function (AF): AF supports: application influence on traffic routing, accessing NEF, interaction with policy framework for policy control. AF usually sits in the control plane and establishes the quality of service and potentially some charging aspects for a service. Simply put, the AF acts a quality controller for specific applications which resides on the network and interconnects with a policy charging and rules function element.

Autonomous System: An autonomous system (AS) is a collection of connected Internet Protocol (IP) routing prefixes under the control of one or more network operators on behalf of a single administrative entity or domain that presents a common, clearly defined routing policy to the internet.

Baseband Unit (BBU): A BBU is a unit that processes baseband in telecommunication systems. The BBU is responsible for communication through the physical interface.

Baseband: Baseband refers to a telecommunication system in which information is carried in digital form on a single un-multiplexed signal channel on the transmission medium. This usage pertains to a baseband network such as Ethernet and token ring local area networks.

Cloud or Centralized RAN (C-RAN): C-RAN is a centralized, cloud computing-based architecture for radio access networks that supports 2G, 3G, 4G and future wireless communication standards. In C-RAN the radio transceivers are separated from the digital baseband processors. This means that radio units can be placed closer to antennas. These radios are often referred to as remote radio units. C-RAN also enables operators to pool their baseband processing units in a convenient location—the base of a tower, or a data center or central office. This is the genesis of the term centralized RAN. A cloud RAN takes the idea one step further by moving functions that are traditionally accomplished by network hardware into software. A cRAN architecture has three primary components—a centralized baseband unit (BBU) pool, remote radio unit (RRU) networks, and transport network or fronthaul: BBU pool—The BBU pool, located at a centralized site, functions as a cloud or a data center.

Common Public Radio Interface (CPRI): CPRI is a specification for wireless communication networks that defines the key criteria for interfacing transport, connectivity and control communications between baseband units (BBUs) and remote radio units (RRUs), which are also called remote radio heads (RRHs).

Consumer Electronics Control (CEC): CEC devices enable a user to manage a plurality of sources connected via HDMI with no special programming needed and to run operations such as 'one touch play'. Using HDMI-CEC, the user may, for example, use one remote control to turn on the TV, DVD, and receiver at the same time, and to adjust the system volume using one button.

Content Delivery Network (CDN): CDN is a system of distributed servers (network) that deliver pages and other Web content to a user, based on the geographic locations of the user, the origin of the webpage and the content delivery server. This service is effective in speeding the delivery of content of websites with high traffic and websites that have global reach. The closer the CDN server is to the user geographically, the faster the content will be delivered to the user. CDNs also provide protection from large surges in traffic.

Edge computing: Edge Computing is a general term for a cloud-based IT service environment located at the edge of a network. The purpose of edge computing and MEC is to bring real-time, high-bandwidth, low-latency access to latency-dependent applications, distributed at the edge of the network. Since edge computing is closer to the end user and apps, it allows for a new class of cloud-native applications, and allows network operators to open their networks to a new ecosystem and value chain.

eNodeB: An eNodeB is the hardware that is connected to the mobile phone network that communicates directly wirelessly with mobile handsets (UEs), like a base transceiver station (BTS) in GSM networks. The eNodeB is directly connected to the Core Network using the S1 interface. The eNodeB is a WLAN access point, i.e. it supports all Layer 1 and Layer 2 features associated to the E-UTRAN Orthogonal Frequency Division Multiplexing physical interface, and they are directly connected to network routers. The termination of Layer 2 protocols in eNodeB helps to decrease data-transmission latency.

E-UTRAN: E-UTRAN is the network architechture defined for the E-UTRA radio interface as a part of 3GPP LTE physical layer specification. E-UTRAN consists of eNBs, providing the E-UTRA user plane (PDCP/RLC/MAC/PHY) and control plane (RRC) protocol terminations towards the UE. The eNBs are interconnected with each other by means of the X2 interface. The eNBs are also connected by means of the S1 interface to the MME of the EPC by means of the S1-MME and to the Serving Gateway (S-GW) by means of the S1-U.

Evolved Packet Core (EPC): EPC is a framework for giving data and converged voice on a network. EPC is based on a constant network connection or an always-on connection. EPC helps in combining voice and data on an Internet Protocol service architecture.

Home Subscriber Server (SSS): The HSS is a centralized database of subscriber information. The role of the HSS is to communicate with the network and provide subscriber profile and authentication information.

Layer 1 (L1): L1 is the physical layer consists of the electronic circuit transmission technologies of a network. It is the layer underlying the higher level functions in a network, and is implemented through different hardware technologies. L1 translates logical communications requests from the data link layer into hardware-specific operations to cause transmission or reception of electronic signals.

Layer 2 (L2): L2 is the protocol layer that transfers data between adjacent network nodes in a wide area network or between nodes on the same local area network segment. The data link layer provides the functional and procedural means to transfer data between network entities and might provide the means to detect and possibly correct errors that may occur in the physical layer.

Machine type communication (MTC): MTC relate to enabling direct communications among electronic devices, dubbed MTC devices, and/or enabling communications from MTC devices to a central MTC server or a set of MTC servers. Communications can use both wireless and fixed networks.

Massive Machine Type Communication (mMTC): mMTC provides connectivity for large numbers of low-cost and low-energy devices in the context of the internet of things (IoT)

MEC Server: The MEC Server provides computing resources, storage capacity, connectivity and access to RAN information. It supports a multitenancy run-time and hosting environment for applications. The virtual appliance applications are delivered as packaged operating system virtual machine (VM) images.

Mobility Management Entity (MME): MME is in charge of all the Control plane functions related to subscriber and session management. From that perspective, the MME supports security procedures; terminal-to-network session handling; and idle terminal location management. The MME is linked through the S6 interface to the HSS which supports the database containing all the user subscription information.

Multi-Access Edge Computing (MEC): MEC is edge computing's standard architecture created by the European Telecommunications Standards Institute's (ETSI's) MEC group. An MEC application runs as a virtualized application, such as a virtual machine (VM) or a containerized application, on top of the virtualization infrastructure provided by the MEC host.

NFV Architecture: The NFV architecture comprises major components including virtualized network functions (VNFs), NFV management and orchestration (MANO), and NFV Infrastructure (NFVI)—that work with traditional network components like OSS/BSS.

NFV Infrastructure (NFVI): NFVI is a key component of the NFV architecture that describes the hardware and software components on which virtual networks are built. NFVI is composed of NFV infrastructure points-of-presence (NFVI-PoPs) which are where the VNFs, including resources for computation, storage, and networking, are deployed by a network operator. NFVI networks interconnect the computing and storage resources contained in an NFVI-PoP. This may include specific switching and routing devices to allow external connectivity. NFVI works directly with VNFs and virtual infrastructure managers (VIMs) and in concert with the NFV orchestrator. NFV services are instantiated at the directive of the NFV orchestrator, which calls on VIMs that manage the resources from the underlying infrastructure (NVFI).

NFV management and network orchestration (MANO): MANO is framework for the management and orchestration of all resources in a virtualized data center including compute, networking, storage, and virtual machine (VM) resources. The main focus of NFV MANO is to allow flexible on-boarding, sidestepping the chaos that can be associated with rapid spin-up of network components.

NFV orchestrator (NFVO): NFVO is a key component of the NFV MANO (network functions virtualization management and network orchestration) architectural framework, which helps standardize the functions of virtual networking to increase interoperability of software-defined networking (SDN) elements. The NFVO performs resource orchestration and network service orchestration, as well as other functions.

Packet Data Network Gateway (PDN-GW) is the termination point of the packet data interface towards the Packet Data Network. As an anchor point for sessions towards the external Packet Data Networks, the PDN GW also supports Policy Enforcement features (which apply operator-defined rules for resource allocation and usage) as well as packet filtering (like deep packet inspection for virus signature detection) and evolved charging support (like per URL charging).

PCRF (Policy and Charging Rules Function) Server: The PCRF server manages the service policy and sends QoS setting information for each user session and accounting rule information.

Radio Access Point (RAP): A RAP is a wireless network device that acts as a portal for devices to connect to a local area network. Access points are used for extending the wireless coverage of an existing network and for increasing the number of users that can connect to it. A RAO is typically configured to serve wireless user devices over relatively small coverage areas and with generally less capacity as compared to a macro base station that is configured to serve a relatively large coverage area ("macro cell") and consequently many more client devices.

Radio Network Information Services (RNIS) provides authorized applications with low-level radio and network information. The RNIS deliver information from the radio network relating to users and cells. The RNIS provide indications relating to the activation of User Equipment (UE) on a specific mobile network element.

S1 interface: The S1 interface is used between eNodeBs (in 4G) and the EPC: specifically, the MME and S-GW. The S1 interface includes the S1-CP (control) and S1-UP part (user plane). The protocols over S1 interfaces are divided into two groups: user-plane protocols that are the protocols implementing the actual E-UTRAN radio access bearer (E-RAB) service, i.e., carrying user data through the autonomous system, and control-plane protocols, which are responsible for controlling the E-RABs and the connection between the UE and the network from different aspects including requesting the service, controlling different transmission resources, and handover.

SDN Analytics Data: SDN Analytics Data actionable information about both legacy and SDN networks. SDN analytics deliver real-time visibility into both the control plane and data plane metrics such as the current state of the network, network topology, IGP and BGP routes, traffic utilization, latency, jitter and device performance. Analytics data, which can be collected using an SDN Analytics application such as the Packet Design Explorer SDN Platform, provides network engineers with the management intelligence required to automate new service requests and model planned changes before actually provisioning it in the network via an SDN controller. For example, an SDN controller automatically provisioning a new transport path for a customer can use SDN analytics data to tell which path from a source to destination has the resources to meet the path constraints. And because SDN analytics provides visibility into the current state of the network, network changes can be planned and provisioned only if the change has no adverse impact on the network.

SDN Orchestration: Software-defined networking (SDN) Orchestration is the process of automatically programming the behavior of the network, so that the network smoothly coordinates with the hardware and the software elements to further support applications and services. Orchestration platforms can include several types of Open source software, which are built using common APIs that could tie into standard networking technologies. SDN Orchestration involves coordinating software with an SDN Controller, which in turn is built using Open Source technology like OpenDaylight. The controller can also be programmed to make automatic decisions regarding the network in the case of network congestion, security problems, and faulty devices. Service Orchestration uses several network protocols including, OpenFlow and IP based networking.

Serving Gateway (S-GW) is the termination point of the packet data interface and serves as a local mobility anchor, meaning that packets are routed through this point for intra E-UTRAN mobility.

SP-GW: An SPGW is an S-GW and PDN-GW.

Ultra reliable MTC (uMTC): uMTC refers to services that provide very high reliability and often very short latencies. Hence, the uMTC service is suitable also for safety critical or mission critical applications, for which a service failure would have severe consequences.

User Equipment (UE): User equipment is any device used directly by an end-user to communicate. It can be a hand-held telephone, a laptop computer equipped with a mobile broadband adapter, or any other device. It connects to the base station Node B/eNodeB.

User plane function (UPF): UPF supports: packet routing & forwarding, packet inspection, QoS handling, acts as external PDU session point of interconnect to Data Network (DN), and is an anchor point for intra- & inter-RAT mobility. (UPF has part of the SGW & PGW functionality from EPC world). is related to the 3GPP 5G Architecture. It is similar to the roles played by the Serving/Packet Gateway in a 4G LTE system. The UPF supports features and capabilities to facilitate user plane operation. Examples include: packet routing and forwarding, interconnection to the Data Network, policy enforcement and data buffering.

vCRAN: (Virtualised Cloud Radio Access Network).

Virtual RAN (vRAN): A vRAN consists of a centralized pool of baseband units (BBUs), virtualized RAN control functions and service delivery optimization. With a virtual RAN, baseband modules are moved away from the base station and to a data center.

System

Illustrated in FIG. 1 is system 100 for a software defined network and edge computing enabled intelligent content delivery over a wireless and a backbone network. The system 100 includes an E-UTRAN network 101 and an EPC network 103.

E-UTRAN network 101 includes a plurality of eNodeBs 105 (or gNodeBs in 5G) and a plurality of radio access points (RAPs) such as RAP 107, RAP 109 and RAP 111. The E-UTRAN network 101 may include one or more video content servers (e.g. VCS 113 and VCS 115 and a virtual baseband pool 117. A TandemMEC server 118 is also provided.

EPC network 103 may include MME 119, HSS 121, PCRF 125 and SP-GW 123.

Accessing E-UTRAN 101 may be a plurality of UEs (e.g. UE-127, UE 129, and UE 131). Also accessing E-UTRAN 101 may be a plurality of IoT devices (e.g. IoT 133 and IoT 135). E-UTRAN 101 may also be accessed by machine to machine sensors and devices (e.g. sensor 137 and sensor 139) through an IoT gateway 141. The traffic from the IoT gateway 141 may be mMTC IoT traffic. In an embodiment IoT 133 may be a connected vehicle with both uMTC and mMTC IoT traffic. In an embodiment IoT 135 may be a medical device with uMTC IoT traffic.

The system 100 also includes an SDN Analytics application 143 which may include a machine learning application and an orchestrator 145. The system 100 may also include an application server 147 and an external network such as the Internet 149. An "other" access network 151 may also be provided having an Other access tool 153 and an MEC/CEC 157.

The Tandem MEC server 118 dynamically controls network traffic over wide area networks (WANs) from the EPC nodes of wireless networks (e.g., a PDN gateway in LTE or AMF, AF, PCF, UPF in 5G) and over the access network, C-RAN or vCRAN, depending on changing network conditions and service application types. The design of the Tandem MEC in C-RAN (vCRAN) for any service delivery, including video, is access-agnostic to the heterogeneous access technologies to achieve a future-proof solution.

Heavy network traffic or unbalanced server loads can slow data transport significantly and lead to a frustrating experience for end users. This SDN and Tandem MEC Server 118 enabled system, may, for example, automatically distribute Internet content from the fastest server located near end user. Thus, this solution takes advantage the Tandem MEC118 and SDN Analytics 143 to transmit data quickly and efficiently. It all happens automatically. The Tandem MEC Server 118 is located in in the C-RAN or vCRAN and supports any logically connected MEC in any edge networks.

The QoS of the end users' traffic will be determined at the edge of the CDN network, such as the Tandem MEC server 118 or edge computing of any access network supporting the current user and this QoS degradation information will be conveyed to the cloud SDN/Analytics for further action. This intelligent based coordination between logically coupled, Tandem MEC Server 118 in a region, C-RAN or vCRAN, any individual local MEC (mobility, cable or satellite), and the central analytics enabled SDN in the core cloud, is a future proof solution for the heterogeneous access and exchange to exchange (E2E) IP network supporting any services over IP.

Five significant components of the blended solution of the proposed architecture are: the Tandem MEC 118, a software defined network and its native machine learning analytics, individual distant MEC (e.g. MEC 155) the Other Access MEC 117 or edge computing component and the Orchestrator In operation, all performance measures/messages from the individual MECs (e.g. MEC 155) are sent to Tandem MEC 118. The Tandem MEC 118 maintains local index table for each distant MECs in any access and performs local computation for each MEC and notifies the central SDN that has native analytics. Analytics enabled SDN generated policies/rules are distributed to the Tandem MEC 118 which in turn distributes this to the supervised MECs (e.g. MEC 155); SDN also can directly send the policy set to the individual MECs (e.g. MEC 155). Individual distant MEC keeps a cache copy of the policies for a specified period of time and periodically queries the Tandem MEC for any changes of a given set of policies. Upon detecting any anomalies based on the pre-known policies the local MEC will trigger and notify the Tandem MEC 118 that executes the policies via any existing orchestrator server or via the SD (implementation specific with some flexibility). The Tandem MEC 118 has the all the reroute information (for disaster or failure recovery) for the core content servers and also the RAN re-configuration data ahead of time. This is the unique capability of the Tandem MEC 118 so that C-RAN/vCRAN can have local authority to support the content delivery needs and demands. The Tandem MEC118 also has the index table of the content sources, such as local cache or the central servers. Tandem MEC 118 will also maintain the frequently viewed movies or any frequently clips list and their sources by using local or SDN Analytics. If the end user requested clips or movies are in the list, the Tandem MEC 118 will reconnect the user at the beginning or at the middle of the transmission session where QoS has been degraded, to the nearby c-RAN/vCRAN supported cloudlet VMs that has the movies or the clips copies. The Tandem MEC 118 will have the support of SDN/Analytics based application awareness that uses a crowd sourcing approach to conduct traffic classification in support of the smart content delivery. This future proof access agnostic Tandem MEC 118 has brought the computation close the edge, any edge (future heterogeneous edge).

Figure 2:
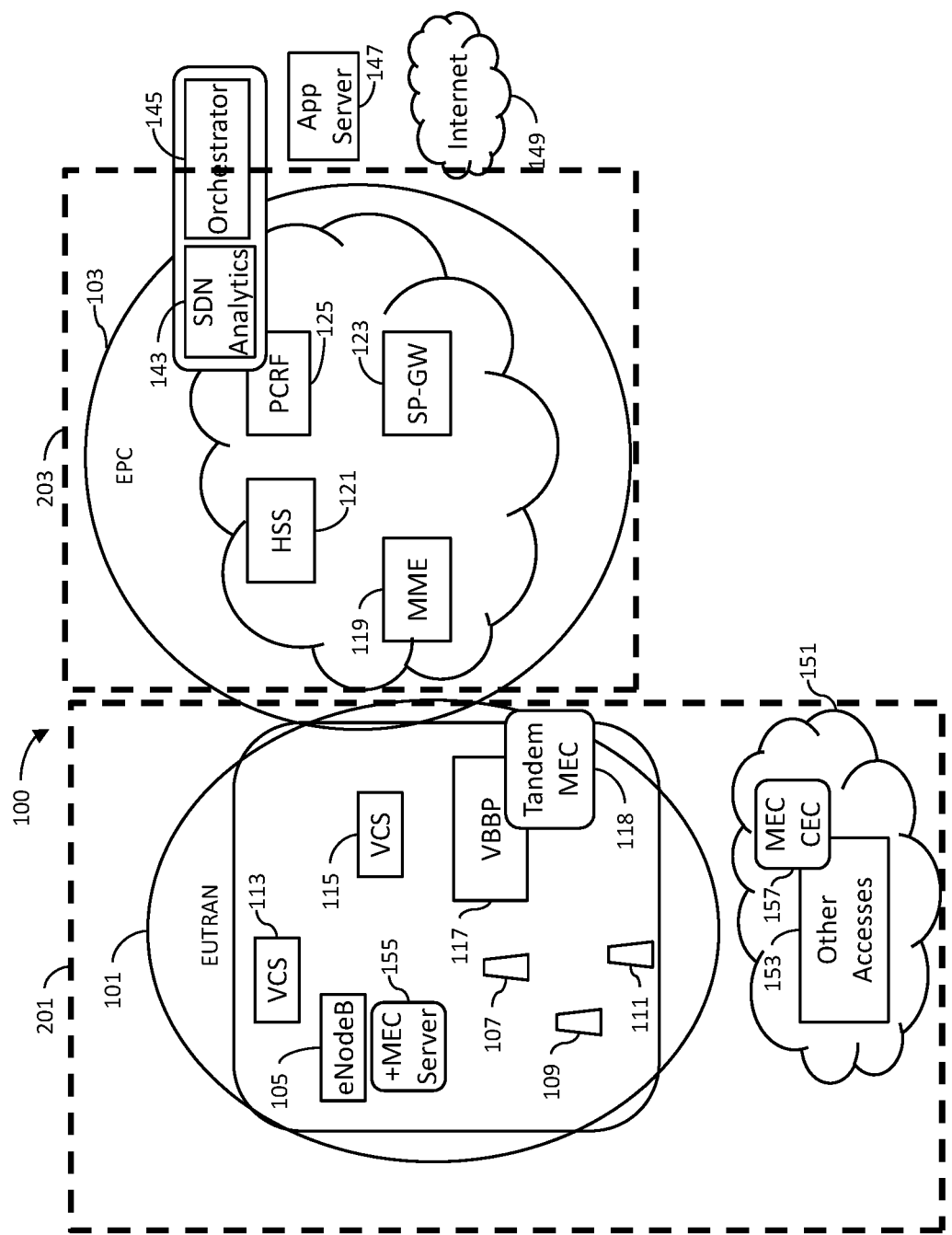
FIG. 2 is a block diagram illustrating an edge cloud and a core cloud.

FIG. 2 illustrates edge cloud 201 that provides heterogeneous access and core cloud 203 which comprises the EPC 103. Edge cloud 201 may be a C-RAN or a vCRAN.

Figure 3:
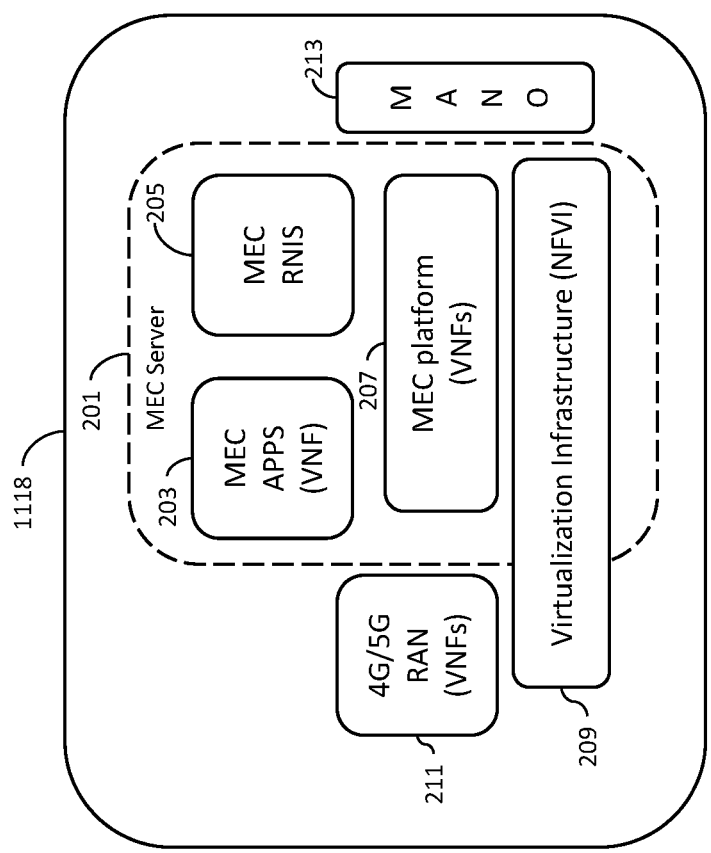
FIG. 3 is a block diagram illustrating the components of Tandem MEC server.

FIG. 3 is a block diagram illustrating the components of Tandem MEC server 118. Tandem MEC server 118 includes an MEC server 201 having a plurality of local MEC applications (which may be a virtual network function) 203, an MEC RNIS 205 and MEC platform 207 (which may be a virtual network function) and virtualization infrastructure 209. Tandem MEC server 118 may also include a 4G/5G RAN (which may be a virtual network function) and a MANO 213.

Figure 4:
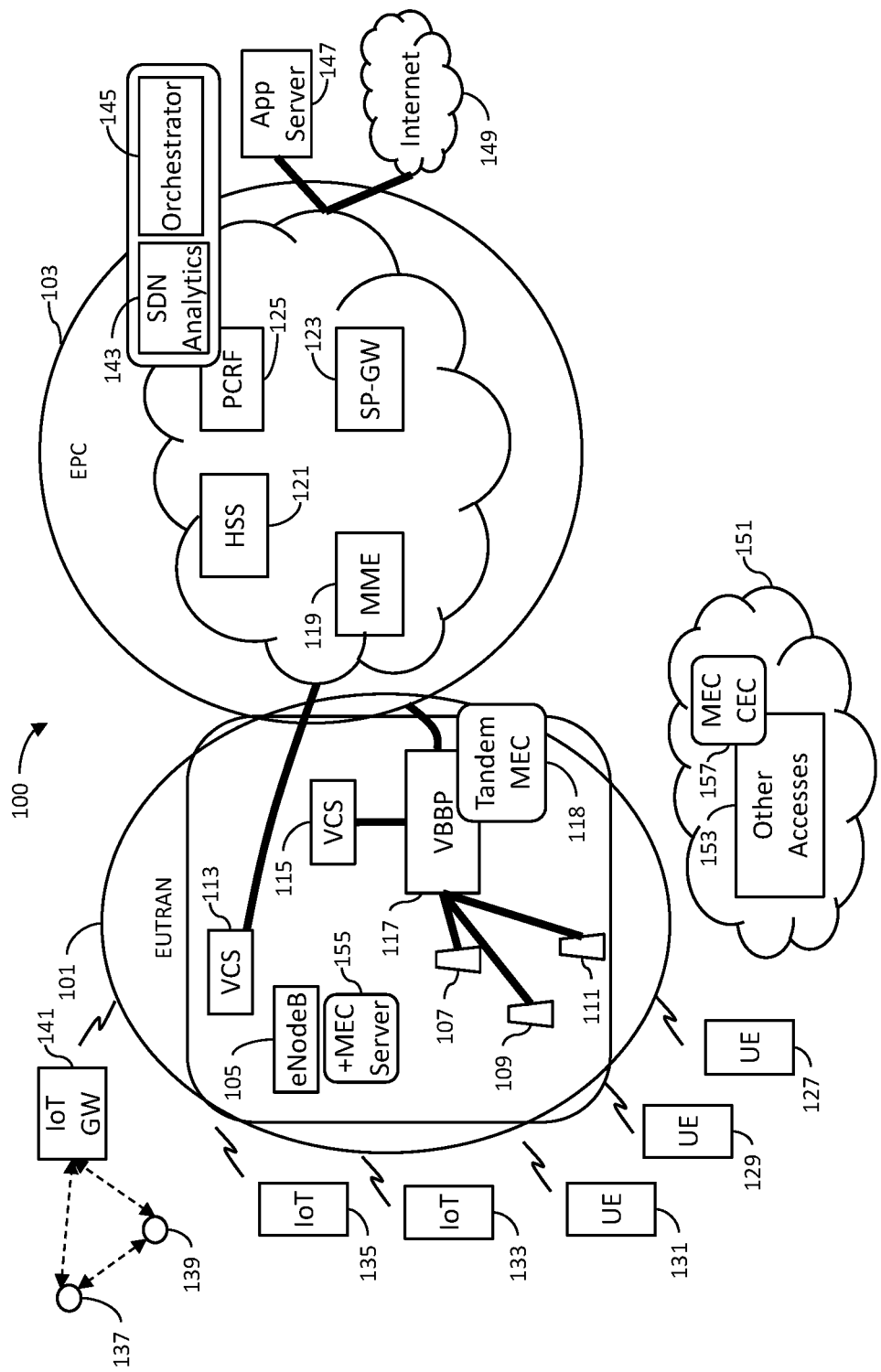
FIG. 4 is a block diagram illustrating video content traffic in a system for intelligent content delivery using a software defined network and edge computing.

Illustrated in FIG. 4 is the video content traffic (heavy solid line). Video content is routed from the video content server 113 through the eNodeB 105 to the EPC 103. The content traffic is then transmitted to the VBBP 117 which then transmits traffic to RAP 107, RAP 109, and RAP 111.

Figure 5:
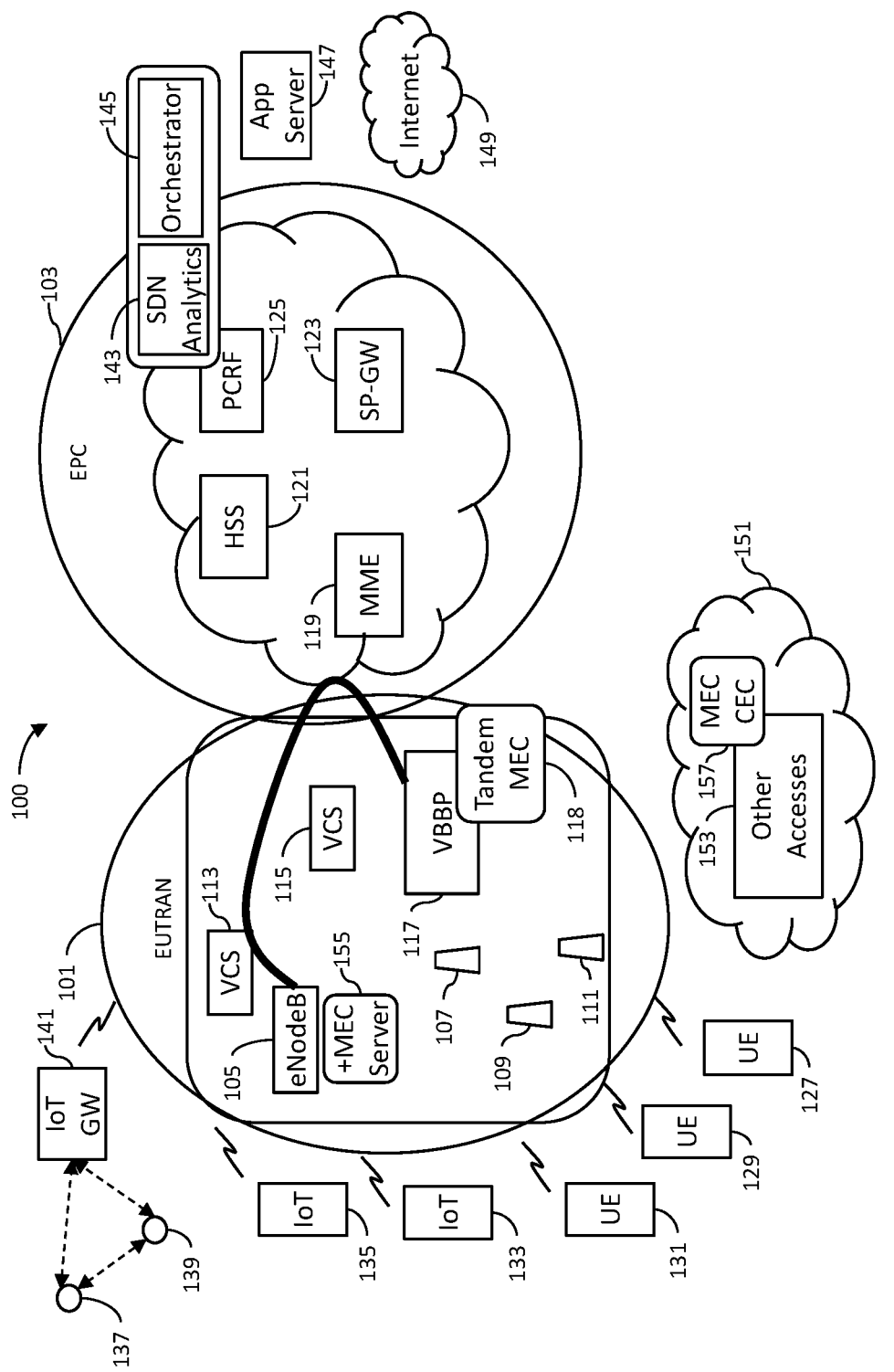
FIG. 5 is a block diagram illustrating S1 traffic in a system for intelligent content delivery using a software defined network and edge computing.

Illustrated in FIG. 5 is the S1 traffic through the E-UTRAN 101 and EPC 103. S1 traffic is routed from the eNodeB 105 to the EPC network 103 to the VBBP 107.

Figure 6:
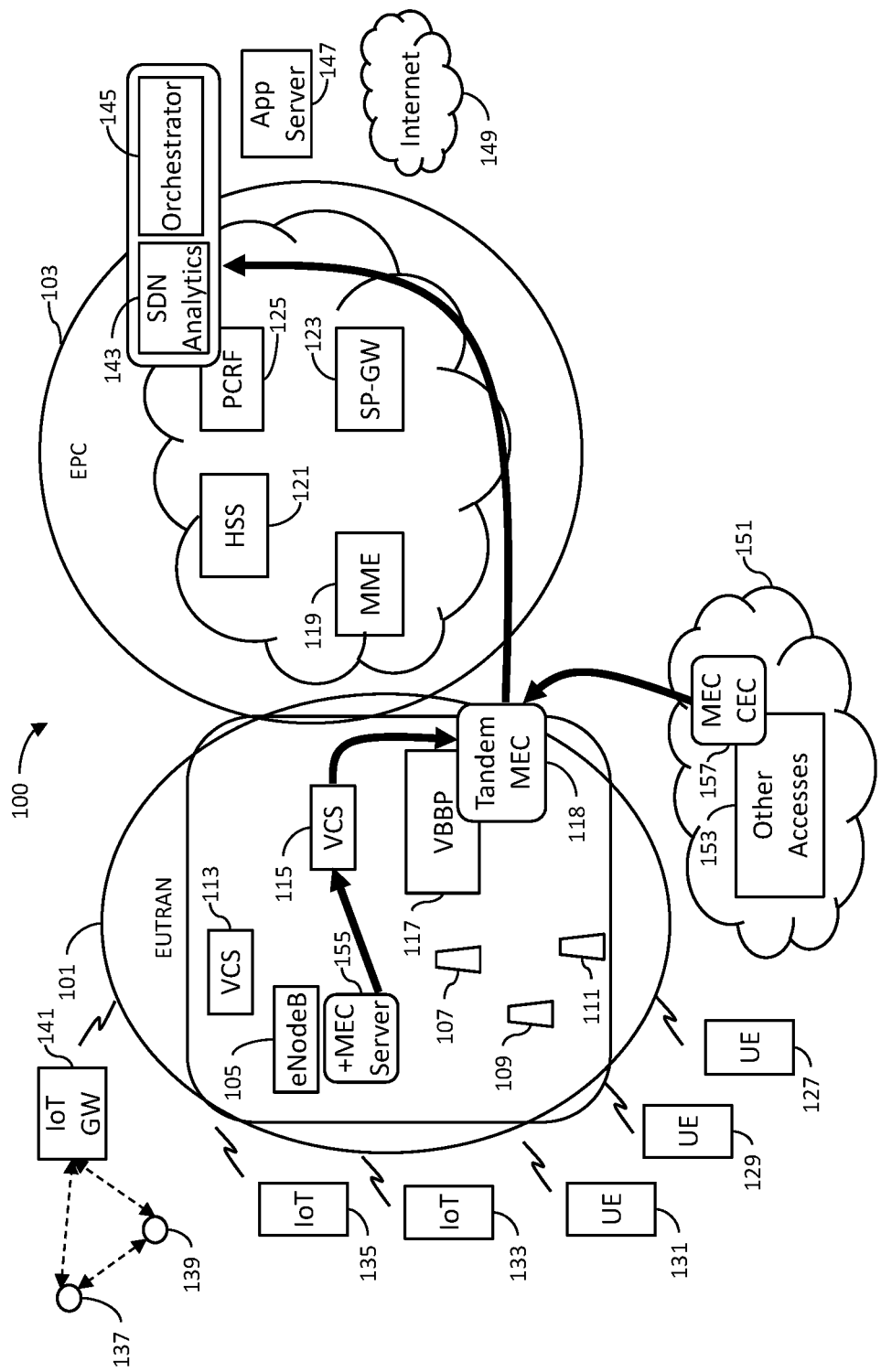
FIG. 6 is a block diagram illustrating CPRI traffic in a system for intelligent content delivery using a software defined network and edge computing.

Illustrated in FIG. 6 is the CPRI traffic from the MEC server 155 and the MEC/CEC server 157 to the Tandem-MEC server 118 and the SDN Analytics application 143.

Figure 7:
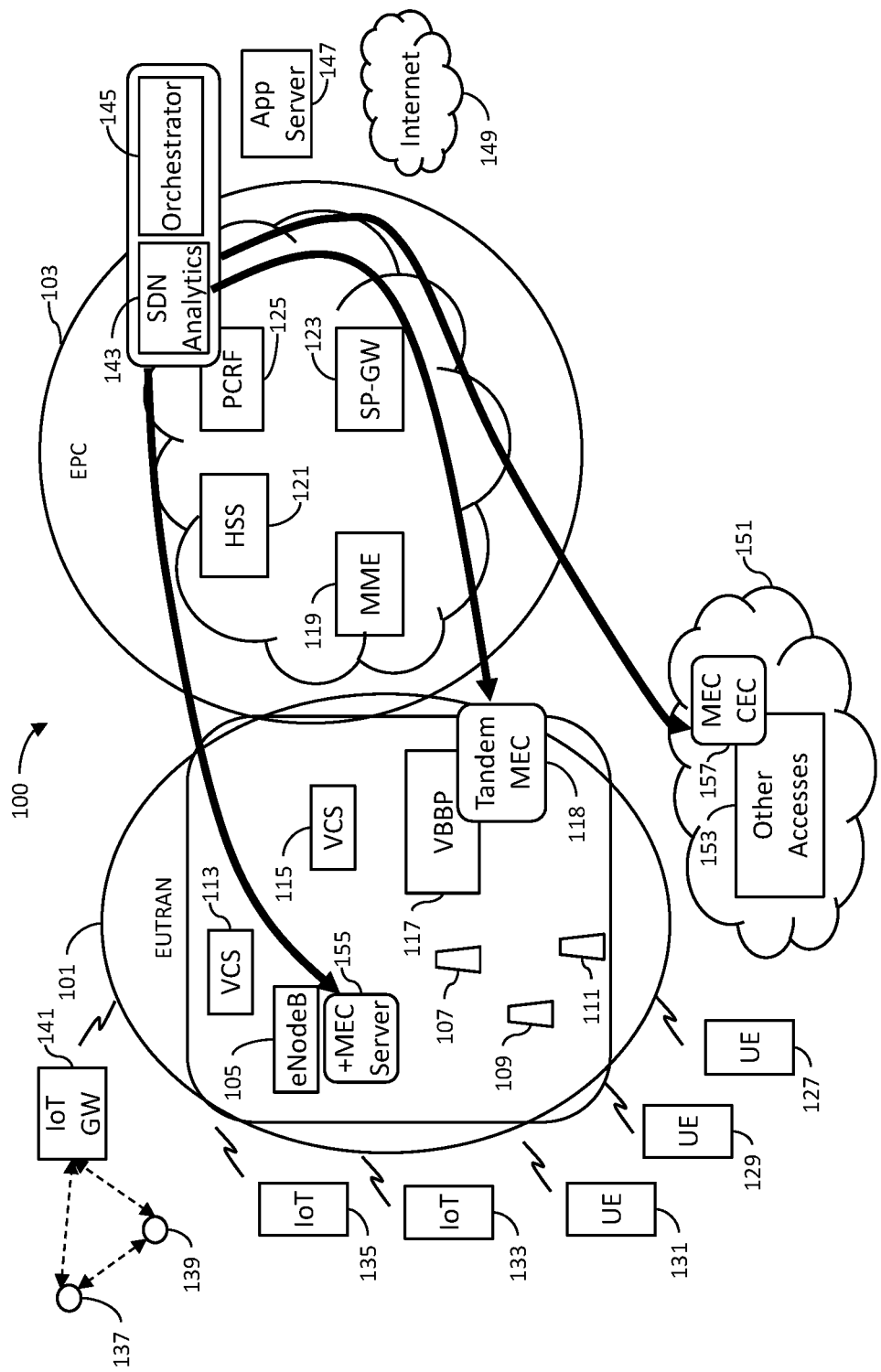
FIG. 7 is a block diagram illustrating CPRI traffic between an SDN analytics application and edge servers in a system for intelligent content delivery using a software defined network and edge computing.

Illustrated in FIG. 7 is the CPRI traffic between the SDN Analytics Application 143 and the MEC server 155, the Tandem MEC Server 118 and the NEC CEC server 157.

Figure 8:
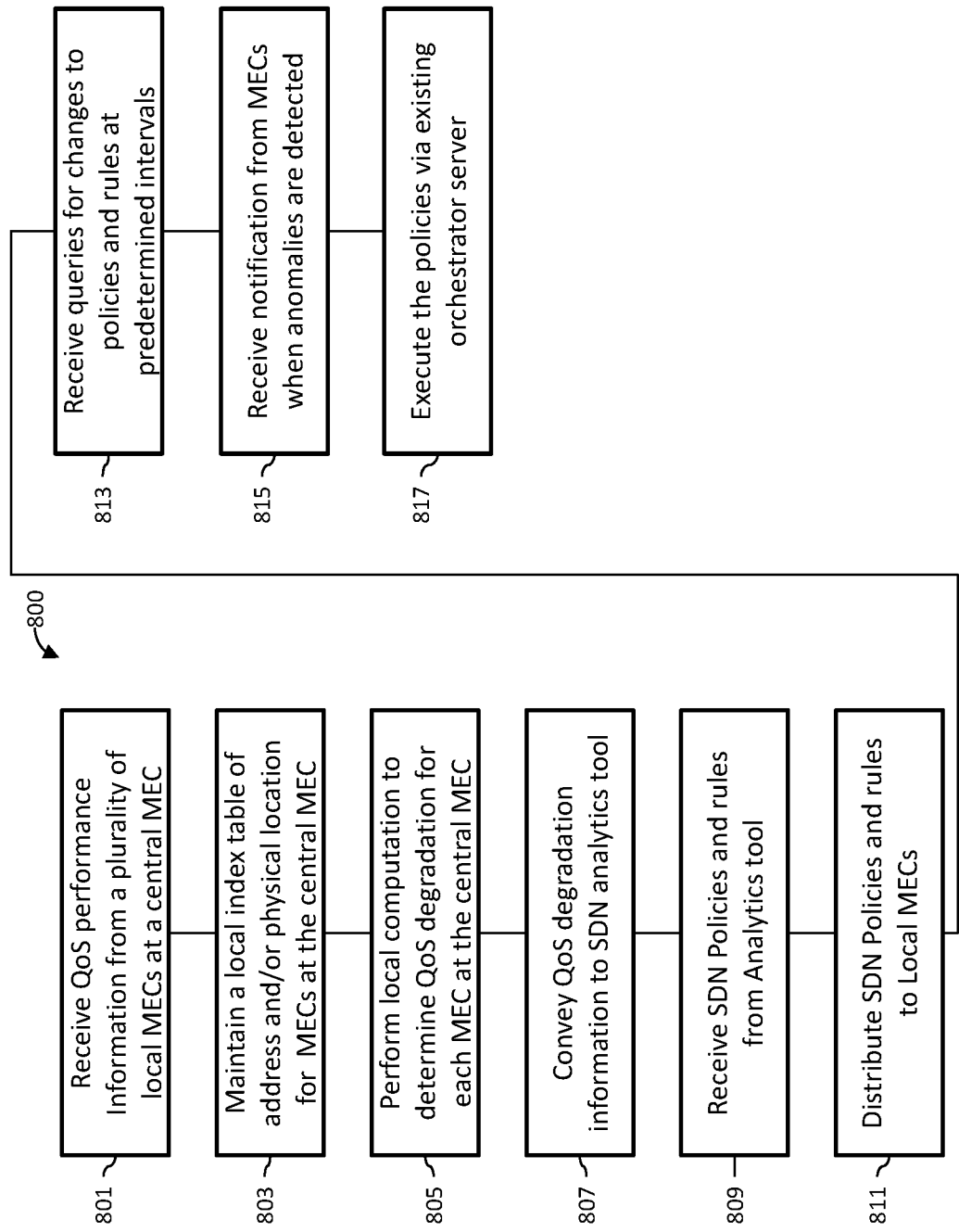
FIG. 8 is a flowchart of a method for intelligent content delivery using a software defined network and edge computing.

FIG. 8 illustrates an embodiment of a method 800 for intelligent content delivery using a software defined network and edge computing.

In step 801 the Tandem MEC server 118 receives performance information from a plurality of local MEC servers (e.g. MEC server 155 in FIG. 1). The performance information may include quality of service information such as packet loss, latency, jitter, any interruption of services, etc.

In step 803 the Tandem MEC server 118 maintains a local index table of addresses/physical locations for a plurality of local MEC servers.

In step 805 the Tandem MEC server 118 performs local computations to determine performance degradation in one or more of the plurality of local MEC servers. The local computation may compare the actual performance statistics to the expected performance statistics. For example, if the MEC server should be having 100 packet loss per second and the Tandem MEC server 118 determines that the actual packet loss per second is 200 packet loss per second then the local calculation is performed to determine abnormality or variations. If the problem happens to be in the RAN, such as capacity scarcity, determined by the Tandem MEC server 118 in real time, the solution will invoke the RAN configurability function based on the real time decision by leveraging policy from Analytics enabled SDN. QoS of the end users' traffic will be determined at the edge of the CDN network, such as Tandem MEC or edge computing of any access network supporting the current user and this QoS degradation information will be conveyed to the cloud SDN/Analytics for further processing.

In step 807, the Tandem MEC server 118 transmits the performance degradation information to the SDN analytics application 143. The SDN Analytics application 143 provides logic to remediate the performance degradation by selecting applicable policies and rules. For example, if on Mondays it has been determined that traffic exceeds the norm the policy/rule may indicate that there is a need for additional bandwidth and instruct the Tandem MEC server 118 to take action. The rerouting and the RAN configurability execution would be done using BAU (current) process of orchestration technique.

In step 811, the Tandem MEC server 118 distributes (communicates) the appropriate routing policies to the local MEC servers. The local MEC servers keep a cache copy of the routing policies for a specified period of time and periodically queries the Tandem MEC 118 for any changes of a given set of routing policies.

In step 813, the Tandem MEC Server 118 receives queries from the local MEC servers for any changes to the routing policies and rules at predetermined interval.

In step 815, the Tandem MEC Server 118 receives notifications from the local MEC when there is a performance degradation (anomaly).

In step 817, the Tandem MEC Server 118 executes the policies via an orchestrator server.

This intelligent based coordination between logically coupled, Tandem MEC in a region, such as C-RAN or vCRAN, any individual local MEC (mobility, cable or satellite), and the central analytics enabled SDN in the core cloud, is a future proof solution for the heterogeneous access and E2E IP network supporting any services over IP.

What is claimed:

1. A method comprising:
   receiving, at a first tandem multi-access edge computing server, performance measures from a plurality of distant multi-access edge computing servers;
   receiving, at the first tandem multi-access edge computing server, routing policies from an analytics application in a software defined network;
   storing, at the first tandem multi-access edge computing server, address and routing information and the routing policies;
   distributing from the first tandem multi-access edge computing server the routing policies to the plurality of distant multi-access edge computing servers;
   receiving, from the plurality of distant multi-access edge computing servers, a periodic query of a change to the routing policies;
   when there is a change in the routing policies, distributing the change to the routing policies to the plurality of distant multi-access edge computing servers;
   receiving, at the first tandem multi-access edge computing server an anomaly notification from at least one of the plurality of distant multi-access edge computing servers; and
   instructing an orchestrator server to implement the routing policies responsive to the anomaly notification.

2. The method of claim 1 wherein the first tandem multi-access edge computing server is disposed in a radio access network.

3. The method of claim 1 further comprising transmitting CPRI traffic from the plurality of distant multi-access edge computing servers to the first tandem multi-access edge computing server.

4. The method of claim 3 further comprising transmitting the CPRI traffic from the first tandem multi-access edge computing server to a software defined network analytics application.

5. The method of claim 4 further comprising transmitting the CPRI traffic from the software defined network analytics application to the plurality of distant multi-access edge computing servers and to the first tandem multi-access edge computing server.

6. The method of claim 1 wherein the routing policies are stored in a software defined network analytics application.

7. The method of claim 1 further comprising receiving update queries of the routing policies from the plurality of distant multi-access edge computing servers.

8. A system comprising:
a memory for storing computer instructions;
a processor coupled with the memory, wherein the processor, responsive to executing the computer instructions, performs operations comprising:
receiving, at a first tandem multi-access edge computing server, performance measures from a plurality of distant multi-access edge computing servers;
receiving, at the first tandem multi-access edge computing server, routing policies from an analytics application in a software defined network;
storing, at the first tandem multi-access edge computing server, address and routing information and the routing policies;
distributing, from the first tandem multi-access edge computing server, the routing policies to the plurality of distant multi-access edge computing servers;
receiving from the plurality of distant multi-access edge computing servers a periodic query of a change to the routing policies;
when there is a change in the routing policies, distributing the change to the routing policies to the plurality of distant multi-access edge computing servers;
receiving, at the first tandem multi-access edge computing server an anomaly notification from at least one of the plurality of distant multi-access edge computing servers; and
instructing an orchestrator server to implement the routing policies responsive to the anomaly notification.

9. The system of claim 8 wherein the first tandem multi-access edge computing server is disposed in a radio access network.

10. The system of claim 8 wherein the processor performs operations further comprising transmitting CPRI traffic from the plurality of distant multi-access edge computing servers to the first tandem multi-access edge computing server.

11. The system of claim 10 wherein the processor performs operations further comprising transmitting the CPRI traffic from the first tandem multi-access edge computing server to a software defined network analytics application.

12. The system of claim 11 wherein the processor performs operations further comprising transmitting the CPRI traffic from the software defined network analytics application to the plurality of distant multi-access edge computing servers and to the first tandem multi-access edge computing server.

13. The system of claim 8 wherein the routing policies are stored in a software defined network analytics application.

14. The system of claim 8 wherein the processor performs operations further comprising receiving update queries of the routing policies from the plurality of distant multi-access edge computing servers.

15. A non-transitory, tangible computer-readable medium having computer-executable instructions stored thereon which, when executed by a computer, cause the computer to perform a method comprising:
receiving, at a first tandem multi-access edge computing server, performance measures from a plurality of distant multi-access edge computing servers;
receiving, at the first tandem multi-access edge computing server, routing policies from an analytics application in a software defined network;
storing, at the first tandem multi-access edge computing server, address and routing information and the routing policies;
distributing from the first tandem multi-access edge computing server, the routing policies to the plurality of distant multi-access edge computing servers;
receiving from the plurality of distant multi-access edge computing servers a periodic query of a change to the routing policies;
when there is a change in the routing policies, distributing the change to the routing policies to the plurality of distant multi-access edge computing servers;
receiving, at the first tandem multi-access edge computing server, an anomaly notification from at least one of the plurality of distant multi-access edge computing servers; and
instructing an orchestrator server to implement the routing policies responsive to the anomaly notification.

16. The non-transitory, tangible computer-readable medium of claim 15 wherein the method performed by the computer comprises receiving at the first tandem multi-access edge computing server disposed in a radio access network performance measures from a plurality of multi-access edge computing servers.

17. The non-transitory, tangible computer-readable medium of claim 15 wherein the method performed by the computer further comprises transmitting CPRI traffic from the plurality of distant multi-access edge computing servers to the first tandem multi-access edge computing server.

18. The non-transitory, tangible computer-readable medium of claim 17 wherein the method performed by the computer further comprises transmitting the CPRI traffic from the first tandem multi-access edge computing server to a software defined network analytics application.

19. The non-transitory, tangible computer-readable medium of claim 18 wherein the method performed by the computer further comprises transmitting the CPRI traffic from the software defined network analytics application to the plurality of distant multi-access edge computing servers and to the first tandem multi-access edge computing server.

20. The non-transitory, tangible computer-readable medium of claim 15 wherein the method performed by the computer further comprises storing the routing policies in a software defined network analytics application.

* * * * *